(12) United States Patent
Sherman

(10) Patent No.: US 9,784,049 B2
(45) Date of Patent: Oct. 10, 2017

(54) CARBON FIBER BASED TUBING ENCAPSULATED CABLE

(71) Applicant: Trican Well Service, Ltd., Calgary (CA)

(72) Inventor: Scott Sherman, Blackie (CA)

( * ) Notice: Subject to any disclaimer, the term of this patent is extended or adjusted under 35 U.S.C. 154(b) by 0 days.

(21) Appl. No.: 14/564,894

(22) Filed: Dec. 9, 2014

(65) Prior Publication Data

US 2015/0184469 A1    Jul. 2, 2015

Related U.S. Application Data

(60) Provisional application No. 61/921,436, filed on Dec. 28, 2013.

(51) Int. Cl.

| *G02B 6/44* | (2006.01) |
|---|---|
| *E21B 17/20* | (2006.01) |
| *H01B 7/02* | (2006.01) |
| *H01B 7/14* | (2006.01) |
| *H01B 7/18* | (2006.01) |
| *H01B 7/20* | (2006.01) |
| *H01B 11/22* | (2006.01) |

(Continued)

(52) U.S. Cl.
CPC .......... *E21B 17/206* (2013.01); *G02B 6/4401* (2013.01); *G02B 6/4427* (2013.01);
(Continued)

(58) Field of Classification Search
None
See application file for complete search history.

(56) References Cited

U.S. PATENT DOCUMENTS

| 4,629,286 A * | 12/1986 | Fuse et al. ........... G02B 6/4486 |
|---|---|---|
| | | 385/102 |
| 5,348,097 A * | 9/1994 | Giannesini et al. .. E21B 17/206 |
| | | 166/385 |

(Continued)

FOREIGN PATENT DOCUMENTS

| GB | 2240189 A * | 7/1991 |
|---|---|---|
| WO | WO 2013/059315 A1 * | 4/2013 |
| WO | WO 2015/095954 A1 * | 7/2015 |

OTHER PUBLICATIONS

International Search Report and Written Opinion, PCT/CA2014/051195, Feb. 24, 2015.

*Primary Examiner* — Mike Stahl

(57) ABSTRACT

Tubing encapsulated cable consists of one or more electrical conductors and possibly one or more fiber optic cables sheathed in a corrosion resistant metallic alloy. However, pumping during the installation of tubing encapsulated cable is required to overcome the capstan effect of the tubing encapsulate cable inside the coil tubing as the tubing encapsulated cable travels through the coiled up wraps of coil tubing. In an embodiment of the invention the tubing encapsulated cable consists of one or more electrical conductors and possibly one or more fiber optic cables sheathed in a fiber reinforced composite sheath. Because there is little drag between the fiber encapsulated cable and the coil tubing, conventional pumping operations used to install braided wireline into coil tubing may not be required when installing fiber encapsulated cable into coil tubing. Additionally, the smooth outside surface and relatively small diameter of the fiber encapsulated cable are desirable attributes for well intervention work because the smooth surface is more resistant to chemical attack than braided wire while the smooth surface and relatively small diameter provide little viscous drag while fluids are pumped through the coil tubing in the course of intervention operations.

36 Claims, 5 Drawing Sheets

(51) Int. Cl.
 H01B 13/06 (2006.01)
 H02G 3/04 (2006.01)
 H01B 7/04 (2006.01)
(52) U.S. Cl.
 CPC ......... *G02B 6/4432* (2013.01); *H01B 7/0241* (2013.01); *H01B 7/14* (2013.01); *H01B 7/1875* (2013.01); *H01B 7/20* (2013.01); *H01B 11/22* (2013.01); *H01B 13/062* (2013.01); *H02G 3/0481* (2013.01); *H01B 7/046* (2013.01); *Y10T 29/49117* (2015.01)

(56) References Cited

U.S. PATENT DOCUMENTS

| | | | |
|---|---|---|---|
| 5,410,106 A | 4/1995 | Nishino | |
| 6,004,639 A | 12/1999 | Quigley | |
| 6,538,198 B1* | 3/2003 | Wooters | E21B 17/206 138/111 |
| 6,772,840 B2* | 8/2004 | Headworth | E21B 17/18 166/302 |
| 2001/0025664 A1* | 10/2001 | Quigley et al. | D04C 1/06 138/125 |
| 2003/0081917 A1 | 5/2003 | Bussear | |
| 2005/0115741 A1* | 6/2005 | Terry | G01V 3/30 175/61 |
| 2006/0280412 A1* | 12/2006 | Varkey | H01B 7/046 385/101 |
| 2010/0215327 A1* | 8/2010 | Braden et al. | G02B 6/4403 385/101 |
| 2014/0190706 A1* | 7/2014 | Varkey et al. | F04B 47/06 166/378 |
| 2014/0367121 A1* | 12/2014 | Varkey et al. | E21B 47/123 166/385 |
| 2015/0226021 A1* | 8/2015 | Zhang et al. | H01B 7/046 166/65.1 |

* cited by examiner

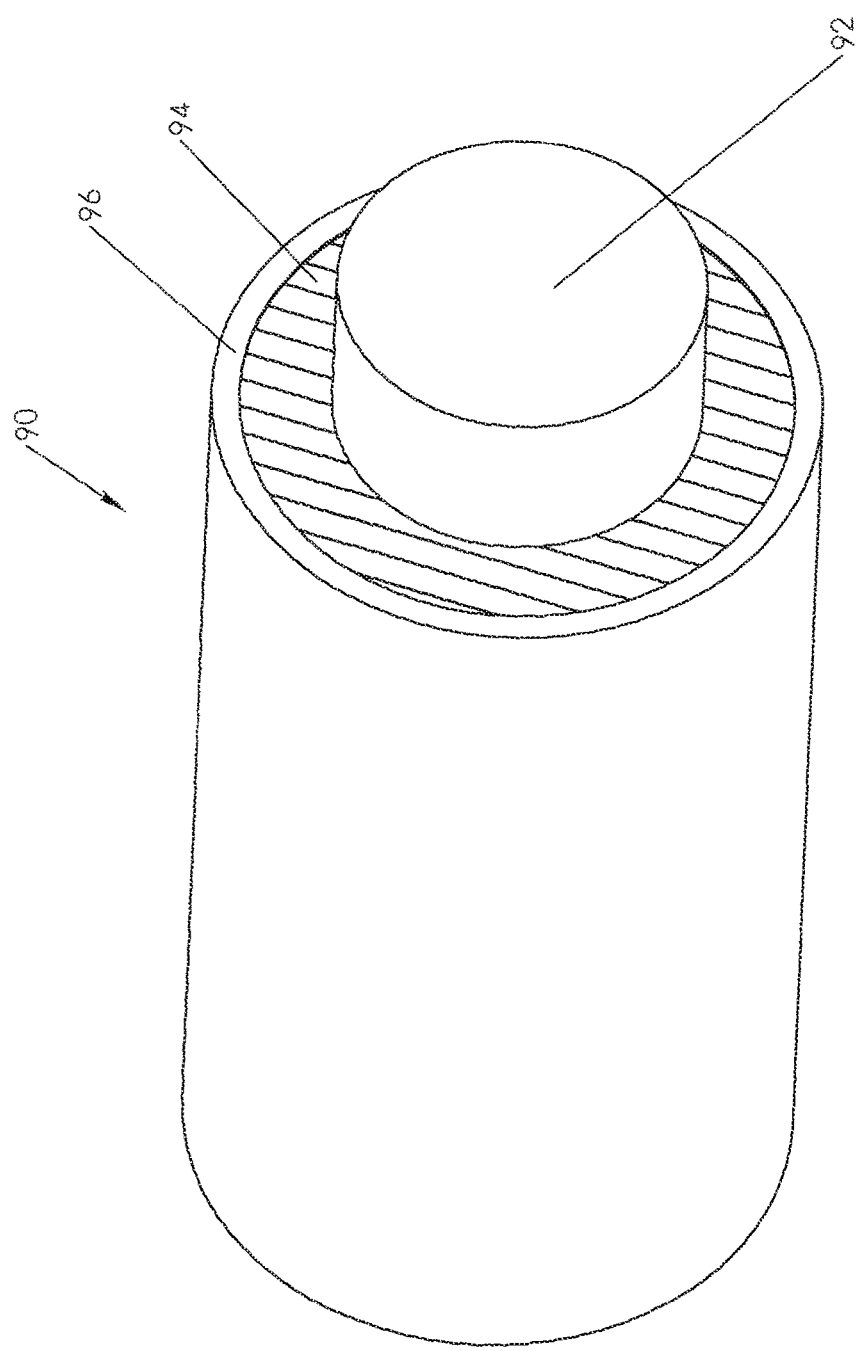

CARBON FIBER BASED TUBING ENCAPSULATED CABLE

CROSS-REFERENCE TO RELATED APPLICATIONS

This application claims priority to U.S. Provisional Patent Application No. 61/921,436 that was filed on Dec. 28, 2013.

BACKGROUND

Tubing encapsulated cable can be difficult to insert into coil tubing. Tubing encapsulated cable typically consists of one or more electrical conductors, a fiber optic cable, and possibly other cables or lines sheathed in a corrosion resistant alloy such as 316 stainless steel or a fiber reinforced composite sheath. The smooth outside surface and relatively small diameter of tubing encapsulated cable are desirable attributes for well intervention work because the relatively smooth surface may be more resistant to chemical attack than braided wire. Additionally, the relatively smooth surface and small diameter (0.125"-0.250") minimizes viscous drag exerted upon the cable as fluids pumped through the coil tubing in the course of intervention operations pass by the cable. Because there is little drag on the tube wire, conventional pumping operations used to install braided wireline into coil tubing are not sufficient to install tubing encapsulated cable. Pumping fluid through the coil tubing during the installation of tubing encapsulated cable is required to assist in overcoming the capstan effect, caused by the friction between the coil tubing and the tubing encapsulated cable as the tubing encapsulated cable travels through the wound coil tubing.

There are numerous techniques that may be utilized to install tubing encapsulated cable into a long tubular member such as coil tubing. Such as hanging the coil into the well in order to allow the somewhat reliable force of gravity to pull the tubing encapsulated cable downward into the interior of the coil tubing. Another commonly known technique involves, prior to utilizing the coil tubing downhole, spooling out the coil tubing along a roadway, installing a rope, cable, or equivalent and using the rope or cable in a manner similar to that of an electrician's fish tape to pull the tubing encapsulated cable into the coil tubing. In these instances fluid may or may not be pumped into the coil tubing while inserting the tubing encapsulated cable. Inserting the tubing encapsulated cable into coil tubing as described above can be an expensive operation. Wire and cable have been used with a tubular conduit since the late 1800s, conduit, like coil tubing, is a long tubular member that normally has wires and cables with a wide variety of outer armors run through it.

Another currently utilized method of installing tubing encapsulated cable into coil tubing is while pumping fluid through the coil tubing to attach a plug to the end of the tubing encapsulated cable. The plug will then pull the tubing encapsulated cable through the coil tubing as the plug is pumped through the coil tubing.

One problem of using a conventional tubing encapsulated cable is that such cables typically have a metallic outer sheath, in particular they usually have a stainless steel outer sheath. When the tubing encapsulated cable outer sheath is a metal that is dissimilar to the metal used to manufacture the coil tubing electrolytic corrosion may be an issue.

SUMMARY

One solution to the problem of electrolytic corrosion between the coil tubing and the tubing encapsulated cable is to replace the metallic outer sheath with plastic or composite fiber wrapped around the inner electrical conductors, a fiber optic cable, communication lines, or other cables.

In one embodiment a carbon fiber composite tube may be formed around an inner core that may consist of one or more electrical conductors or fiber optic cables or some combination of electrical conductors and fiber optic cables. The carbon fiber composite tubing may be formed around the inner core by a continuous braiding process where independent strands of fiber are spirally braided together to form a tube that encapsulates the inner core. In many instances after the carbon fiber composite tubing is formed around the inner core the carbon fiber outer sheath may be impregnated with an epoxy or other binder. Such a tube may be created in any length desired but preferably of such a length as to match the length of the coil tubing, plus about ten percent, that the carbon fiber wrapped core will be installed in.

In an alternative embodiment an inner core such as a communications line or a cable may be laid over the top of a flat length of pre-woven carbon fiber such a length of carbon fiber cloth. The pre-woven carbon fiber may then by rolled into a tubular or other shape to encapsulate the inner core. The now adjoining edges of the pre-woven carbon fiber may then be attached by various means including sewing the edges together, by using an adhesive such as an epoxy to bond the edges of the pre-woven cloth together, or by impregnating the carbon fiber outer sheath with epoxy or other binder or adhesive.

In another embodiment the fiber encapsulated cable for downhole use is installed in coil tubing. A conductor may be at least a first conductor and a second conductor. The first conductor may be an electrical conductor and the second conductor may be an optical conductor. In certain instances the conductor may have a coating and that coating may be an insulator. A carbon fiber sheath wraps around the conductor and the carbon fiber sheath typically has a low coefficient of friction between the coil tubing and the carbon fiber sheath as the sheath is pulled along the interior surface of the coil tubing. The fiber sheath may be resin impregnated. A filler may separate the conductor from the fiber sheath. In certain instances the filler may be electrically conductive or electrically insulative. Typically the fiber encapsulated cable is pulled through the coil tubing in order to insert the fiber encapsulated cable into the coil tubing without pumping a fluid through the coil tubing.

Conventional wireline or metallic tubing encapsulated cable has poor corrosion resistance. Because the encapsulation material of this alternative embodiment is not metallic, no electrolytic related corrosion of the coil tubing or the cable can take place. Additionally, carbon fiber is typically inert and is less susceptible to damage by wellbore fluids.

Conventional wireline or metallic tubing encapsulated cable is relatively heavy requiring slack management. Slack management includes periodic back pumping fluid through the coil tubing. However, carbon fiber encapsulated cable is relatively lightweight and tends to reduce the overall weight of the tubing encapsulated cable when compared to conventional wireline or metallic tubing encapsulated cable. Such a reduction in weight reduces the requirement of managing any slack in the line as the tubing encapsulated cable is run into the coil tubing. Additionally, the low viscous drag of tubing encapsulated cable due to its relatively small diameter and consequent low surface area together with an appropriately engineered outer surface, that also reduces the weight, greatly reduce the need for slack management and back pumping operations.

BRIEF DESCRIPTION OF THE DRAWINGS

FIG. 5 depicts a fiber encapsulated cable having a single conductor.

DETAILED DESCRIPTION

The description that follows includes exemplary apparatus, methods, techniques, or instruction sequences that embody techniques of the inventive subject matter. However, it is understood that the described embodiments may be practiced without these specific details.

Figure 1:
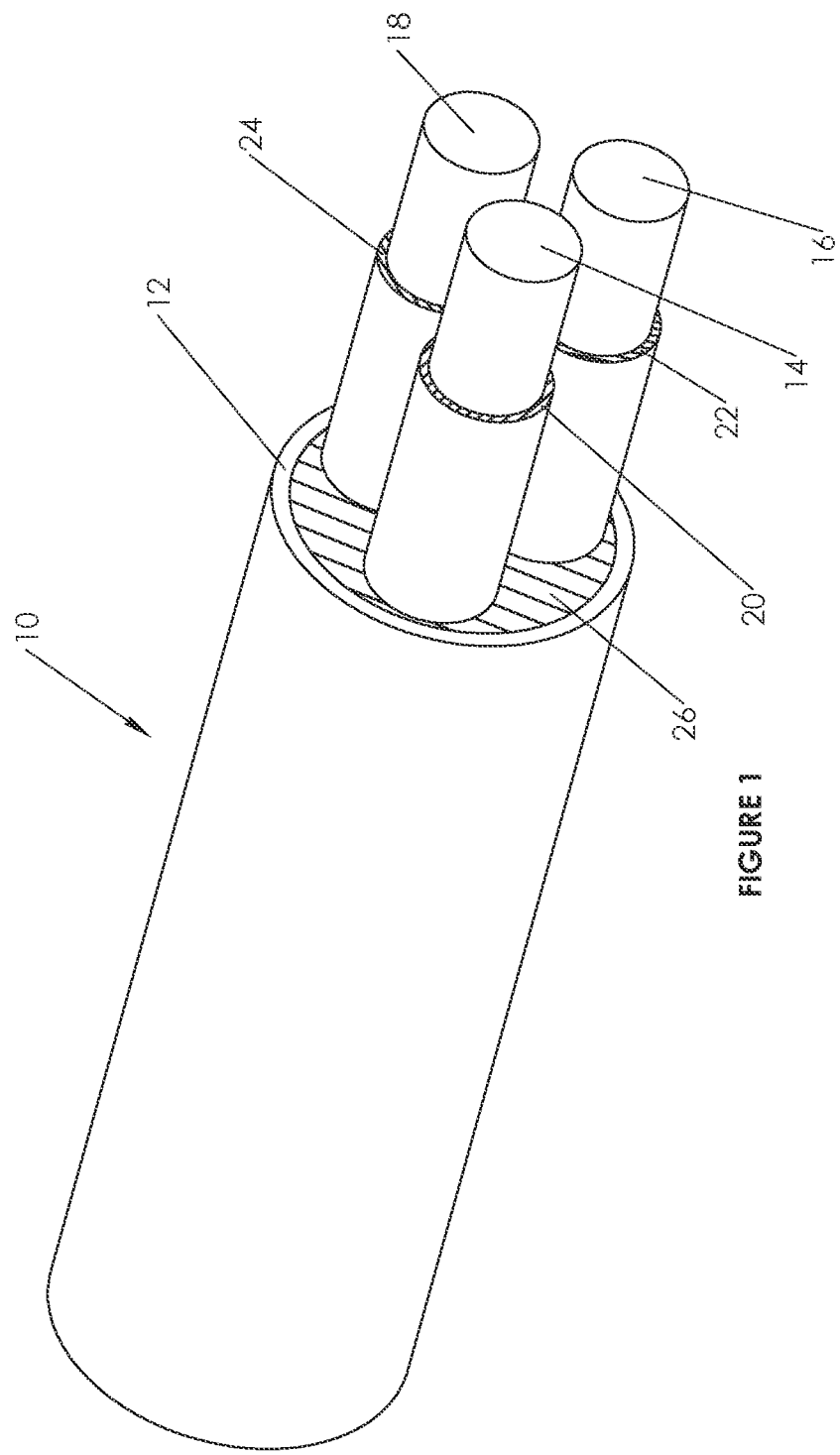
FIG. 1 depicts a fiber encapsulated cable having a number of conductors wrapped in a carbon fiber sheath.

FIG. 1 depicts an embodiment of the present invention where a fiber encapsulated cable 10 has a number of conductors wrapped in a carbon fiber sheath 12. While the carbon fiber sheath 12 is shown, other types of fiber, such as fiberglass, may be used. Depending upon the properties of the carbon fiber the carbon fiber sheath may be either an electrical insulator or an electrical conductor. Usually the carbon fiber is combined with a resin as the carbon fiber sheath 12 is formed around the inner core of conductors, coatings, and pliable material. The fiber encapsulated cable 10 may have any number of conductors, such as the three conductors 14, 16, and 18 shown, where each conductor 14, 16, or 18 may have a coating 20, 22, or 24 that may be an insulator, an optical coating, a bonding layer, a protective layer against corrosion or other degradation, or other material depending upon the requirements for the fiber encapsulated cable 10. Multiple coating layers may be used for each conductor. In many instances the optical conductor may be coated with an electrical conductor while an electrical conductor may be coated with an electrical insulator. A carbon fiber may be used as a coating 20, 22, or 24 and depending upon the fiber's properties could be either an electrical insulator or a conductor. In many instances it is desirable to embed the conductors 14, 16, and 18 and their coatings 20, 22, and 24 in a pliable material 26. The pliable material 26 may provide support for the carbon fiber sheath 12. The pliable material 26 also provides additional protection from mechanical or chemical damage to the conductors 14, 16, and 18 and their coatings 20, 22, and 24. The pliable material 26 may also be used as an additional conductor depending upon the properties of the material used for the pliable material 26. In most instances the pliable material 26 will be a carbon fiber matrix comprised of strands of carbon fiber and/or carbon nano-tubes in a polymer matrix that bonds the matrix together although the pliable material could be a simple polymer or plastic material.

In FIG. 1 the tubing encapsulated cable may be constructed by fixing one or more coatings 20, 22, or 26 onto a conductor 14, 16, or 18. In some instances a conductor may not have a coating. The conductors 14, 16, and 18 and their respective coatings 20, 22, and 24 are then bound together in the pliable material 26 to form the inner core. The carbon fiber sheath 12 may be spiral wound onto the inner core although in some instances the carbon fiber sheath may be formed from a pre-woven mat that is then folded over the inner core so that the pre-woven mat's edges overlap and are then held in place by resin or some other adhesive. In other instances the pre-woven mat may be spiral wrapped around the inner core.

Figure 2:
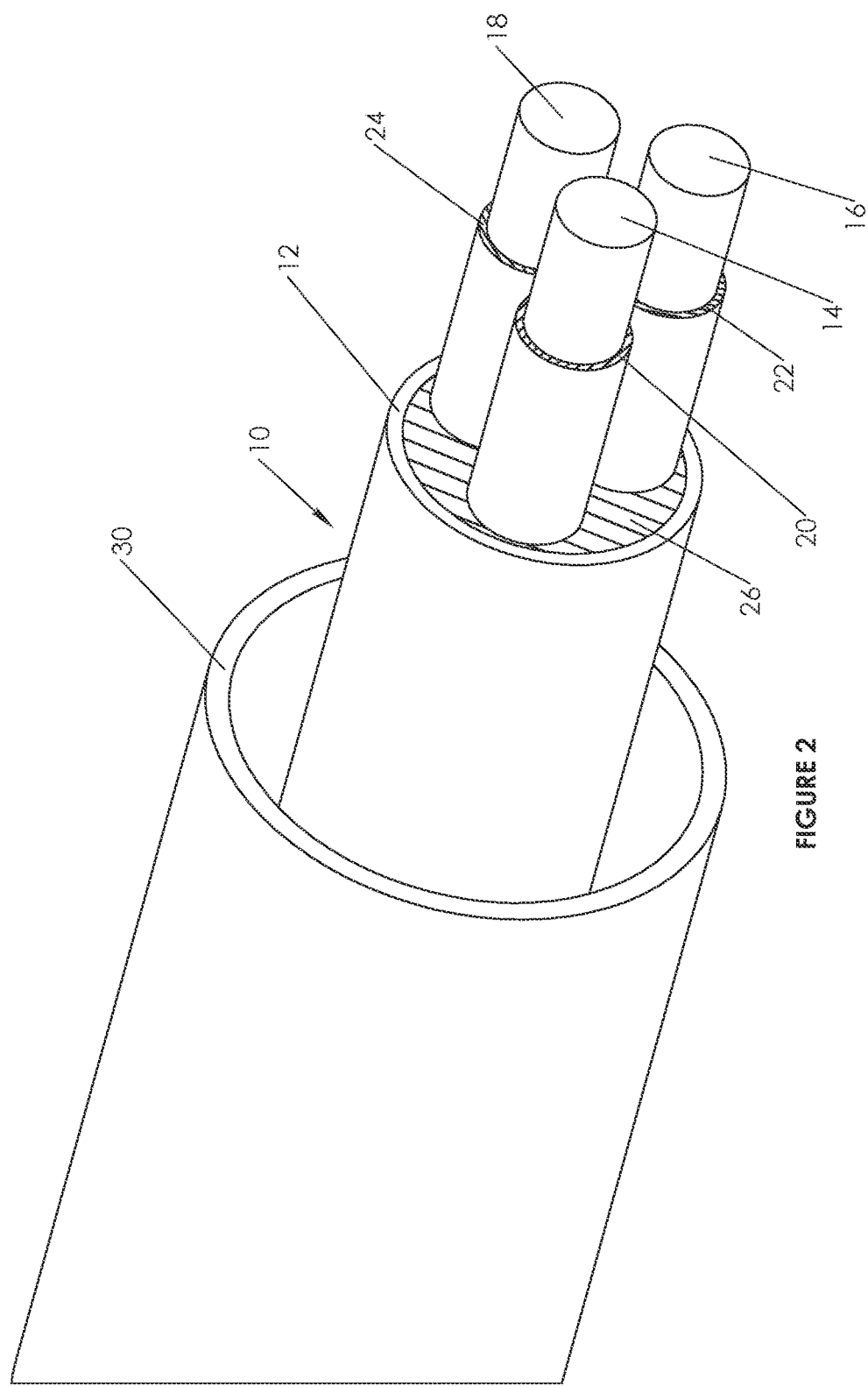
FIG. 2 depicts the fiber encapsulated cable after it has been installed in a coil tubing.

FIG. 2 depicts the fiber encapsulated cable 10 of FIG. 1 after it has been installed in a coil tubing 30. In many instances the fiber encapsulated cable 10 may be installed in the coil tubing 30 by pulling the fiber encapsulated cable 10 through the interior of the coil tubing 30. The fiber encapsulated cable 10 is especially suitable for being pulled through the interior of the coil tubing 30 as the carbon fiber sheath 12 fiber tends to have a high tensile strength making it suitable for being pulled. The carbon fiber sheath 12 also tends to have a low friction coefficient as compared to a metal encapsulated cable. The low friction between the coil tubing 30 and the carbon fiber sheath 12 of the fiber encapsulated cable 10 reduces the capstan effect between the coil tubing 30 and the fiber encapsulated cable 10 as the fiber encapsulated cable 10 is pulled around bends and curves in the coil tubing 30 and generally reduces the friction between longs lengths of the fiber encapsulated cable 10 and the coil tubing 30 as the carbon fiber sheath 12 rubs against the interior of the coil tubing 30.

Figure 3:
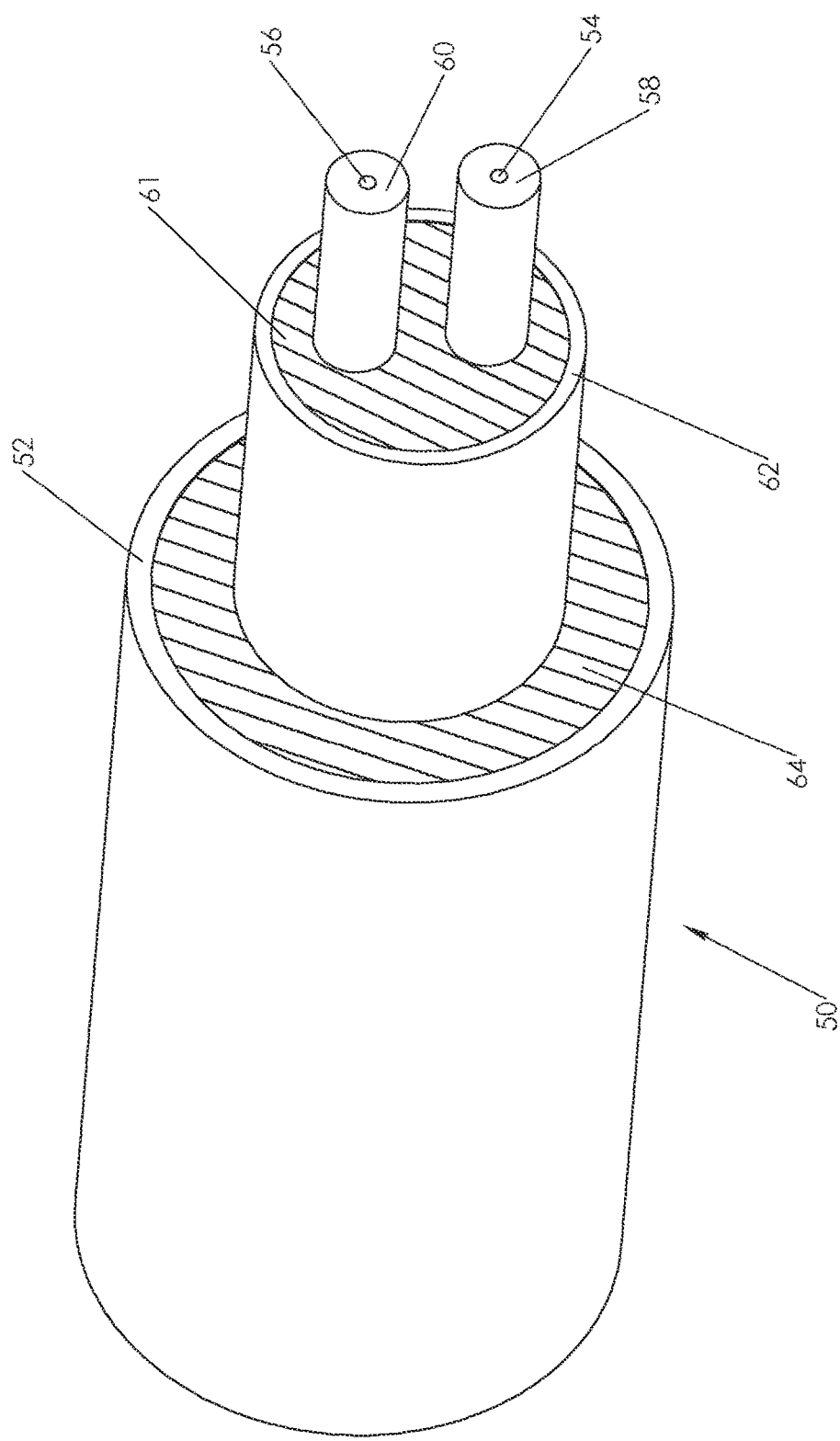
FIG. 3 depicts a fiber encapsulated cable having an inner sheath and a fiber outer armor sheath.

FIG. 3 depicts an alternative embodiment of a fiber encapsulated cable 50. In this embodiment the fiber encapsulated cable 50 has at least one inner conductor and in this embodiment two inner conductors 54 and 56. Each conductor 54 and 56 may be electrically or optically conductive. In the fiber encapsulated cable 50 the conductors may be of different types, for example conductor 54 may be electrically conductive while conductor 56 may be optically conductive. Each inner conductor 54 and 56 may have an outer coating 58 and 60. The conductors 54 and 56 as well as their respective coatings 58 and 60 may then be encapsulated in a pliable material 61. In certain instances the pliable material 61 is not necessary and the conductors 54 and 56 as well as their respective coatings 58 and 60 may be wrapped by a first sheath 62. In other instances the pliable material 61 may harden over a preset period of time such that the pliable material may harden after installation in the coil tubing. The first sheath may be a fiber sheath, such as carbon fiber but may be a metal sheath as well. An intervening layer 64 surrounds and protects the conductors 54 and 56, coatings 58 and 60, and first sheath 62. The intervening layer 64 may be electrically conductive and may be a carbon fiber matrix comprised of strands of carbon fiber and/or carbon nano-tubes in a polymer matrix that bonds the matrix together although the pliable material could be a simple polymer or plastic material. An outer armor layer 52 may be resin impregnated carbon fiber or some other fiber as is known in the industry.

Figure 4:
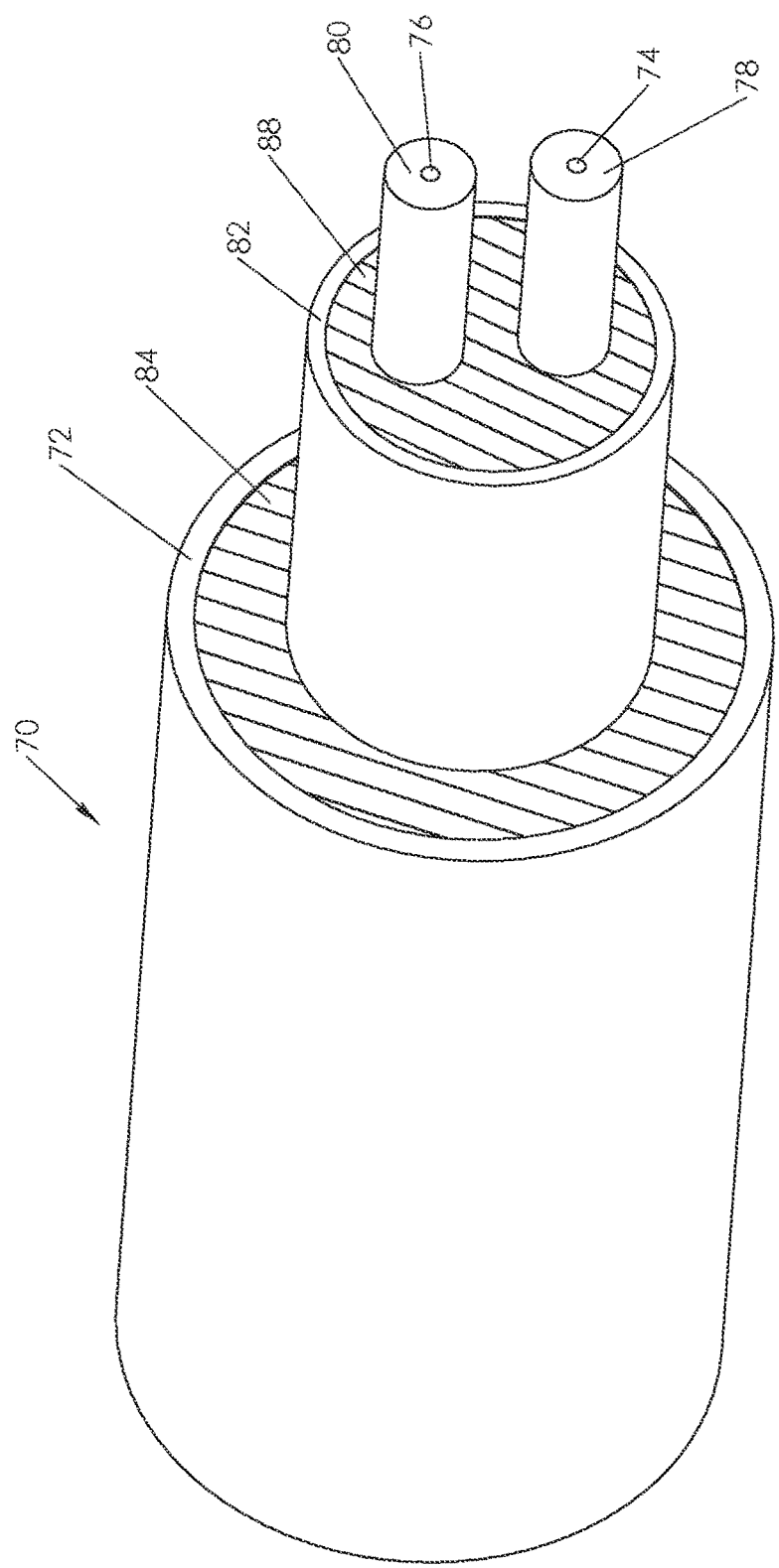
FIG. 4 depicts a fiber encapsulated cable having an inner sheath and an outer electrical isolation layer that chemically protects the inner layers from treating fluids as well as wellbore fluids.

FIG. 4 depicts an alternative embodiment of a fiber encapsulated cable 70. In this embodiment the fiber encapsulated cable 70 has at least one and in this embodiment two inner conductors 74 and 76. Each conductor 74 and 76 may be electrically or optically conductive. In a single fiber encapsulated cable 70 the conductors may be of different types, for example conductor 74 may be electrically conductive while conductor 76 may be optically conductive. Each inner conductor 74 and 76 may have an outer coating 78 and 80. The conductors 74 and 76 as well as their respective coatings 78 and 80 may then be encapsulated in a pliable material 88. In certain instances the pliable material 88 is not necessary and the conductors 74 and 76 as well as their respective coatings 78 and 80 may be wrapped by a first sheath 82. The first sheath may be a fiber sheath, such as carbon fiber but may be a metal sheath as well. An intervening layer 84 surrounds and protects the conductors 74 and 76, coatings 78 and 80, and first sheath 82. The intervening layer 84 may be electrically conductive and may be a carbon fiber matrix comprised of strands of carbon fiber and/or carbon nano-tubes in a polymer matrix that bonds the matrix together although the pliable material could be a simple polymer or plastic material. An outer armor layer 72 is an electrical isolation layer that also chemically protects the inner layers from treating fluids as well as wellbore fluids.

FIG. 5 depicts an alternative embodiment of a fiber encapsulated cable 90. In this embodiment the fiber encapsulated cable 90 has a single conductor 92. The conductor 92 may be metallic, electrically conducting fiber such as carbon fiber, or a fiber optic cable. The conductors 92 may then be encapsulated in a pliable material 94. In many instances a resin is added to the pliable material 94, where the pliable material is a material such as chopped carbon fiber. The resin allows the pliable material 94 to harden thereby forming the fiber encapsulated material into a rod. An outer armor layer 96 that encapsulates the conductor 92 and the pliable material 94 may be resin impregnated carbon fiber or some other fiber as is known in the industry. In certain instances the pliable material 94 is not necessary and the conductor 92 may be encapsulated by only the outer armor layer 96.

The methods and materials described as being used in a particular embodiment may be used in any other embodiment. While the embodiments are described with reference to various implementations and exploitations, it will be understood that these embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A fiber encapsulated cable for downhole use comprising:
    a coil tubing having a central passageway,
    a conductor,
    a carbon fiber sheath wrapped around the conductor;
        wherein the carbon fiber sheath and the conductor are installed in the coil tubing central passageway.

2. The fiber encapsulated cable for downhole use of claim 1 wherein, the carbon fiber sheath has a coefficient of friction lower than the coefficient of friction of a metal encapsulated cable.

3. The fiber encapsulated cable for downhole use of claim 1 wherein, the carbon fiber sheath is resin impregnated.

4. The fiber encapsulated cable for downhole use of claim 1 wherein, the conductor has a coating.

5. The fiber encapsulated cable for downhole use of claim 4 wherein, the coating is an insulator.

6. The fiber encapsulated cable for downhole use of claim 1 wherein, the conductor is at least a first conductor and a second conductor.

7. The fiber encapsulated cable for downhole use of claim 6 wherein, the first conductor is an electrical conductor.

8. The fiber encapsulated cable for downhole use of claim 6 wherein, the second conductor is an optical conductor.

9. The fiber encapsulated cable for downhole use of claim 1 wherein, a filler separates the conductor from the carbon fiber sheath.

10. The fiber encapsulated cable for downhole use of claim 9 wherein, the filler is electrically conductive.

11. The fiber encapsulated cable for downhole use of claim 9 wherein, the filler is electrically insulative.

12. The fiber encapsulated cable for downhole use of claim 1 wherein, the fiber encapsulated cable is installed in the coil tubing without pumping a fluid through the coil tubing.

13. A method of installing a fiber encapsulated cable in coil tubing comprising:
    pulling a conductor into a coil tubing central passageway, wherein the conductor is wrapped in a carbon fiber sheath.

14. The method of installing a fiber encapsulated cable in coil tubing of claim 13 wherein, the carbon fiber sheath has a coefficient of friction lower than the coefficient of friction of a metal encapsulated cable.

15. The method of installing a fiber encapsulated cable in coil tubing of claim 13 wherein, the carbon fiber sheath is resin impregnated.

16. The method of installing a fiber encapsulated cable in coil tubing of claim 13 wherein, the conductor has a coating.

17. The method of installing a fiber encapsulated cable in coil tubing of claim 16 wherein, the coating is an insulator.

18. The method of installing a fiber encapsulated cable in coil tubing of claim 13 wherein, the conductor is at least a first conductor and a second conductor.

19. The method of installing a fiber encapsulated cable in coil tubing of claim 18 wherein, the first conductor is an electrical conductor.

20. The method of installing a fiber encapsulated cable in coil tubing of claim 18 wherein, the second conductor is an optical conductor.

21. The method of installing a fiber encapsulated cable in coil tubing of claim 13 wherein, a filler separates the conductor from the carbon fiber sheath.

22. The method of installing a fiber encapsulated cable in coil tubing of claim 21 wherein, the filler is electrically conductive.

23. The method of installing a fiber encapsulated cable in coil tubing of claim 21 wherein, the filler is an electrical insulator.

24. The method of installing a fiber encapsulated cable in coil tubing of claim 13 wherein, the fiber encapsulated cable is installed in the coil tubing without pumping a fluid through the coil tubing.

25. A fiber encapsulated cable for downhole use comprising:
    a coil tubing having a central passageway,
    a conductor,
    a carbon fiber filler and a resin wrapped around the conductor,
    a carbon fiber sheath wrapped around the carbon fiber filler and the resin;
        wherein the carbon fiber sheath, the carbon fiber filler, the resin, and the conductor are installed in the coil tubing central passageway.

26. The fiber encapsulated cable for downhole use of claim 25 wherein, the carbon fiber sheath has a coefficient of friction lower than the coefficient of friction of a metal encapsulated cable.

27. The fiber encapsulated cable for downhole use of claim 25 wherein, the carbon fiber sheath is resin impregnated.

28. The fiber encapsulated cable for downhole use of claim 25 wherein, the conductor has a coating.

29. The fiber encapsulated cable for downhole use of claim 28 wherein, the coating is an insulator.

30. The fiber encapsulated cable for downhole use of claim 25 wherein, the conductor is at least a first conductor and a second conductor.

31. The fiber encapsulated cable for downhole use of claim 30 wherein, the first conductor is an electrical conductor.

32. The fiber encapsulated cable for downhole use of claim 30 wherein, the second conductor is an optical conductor.

33. The fiber encapsulated cable for downhole use of claim 25 wherein, the carbon fiber filler is electrically conductive.

34. The fiber encapsulated cable for downhole use of claim 25 wherein, the carbon fiber filler is electrically insulative.

35. The fiber encapsulated cable for downhole use of claim 25 wherein, the carbon fiber filler and the resin harden to form a carbon fiber rod.

36. The fiber encapsulated cable for downhole use of claim 25 wherein, the fiber encapsulated cable is installed in the coil tubing without pumping a fluid through the coil tubing.

* * * * *